US012724671B2

(12) United States Patent
Sharon et al.

(10) Patent No.: US 12,724,671 B2
(45) Date of Patent: Sep. 1, 2026

(54) JOINT LDPC AND RAID DECODING SCHEME

(71) Applicant: Sandisk Technologies, Inc., Milpitas, CA (US)

(72) Inventors: Eran Sharon, Rishon Lezion (IL); Alexander Bazarsky, Holon (IL); Ran Zamir, Ramat Gan (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/922,289

(22) Filed: Oct. 21, 2024

(65) Prior Publication Data

US 2026/0111311 A1 Apr. 23, 2026

(51) Int. Cl.
*G06F 11/10* (2006.01)

(52) U.S. Cl.
CPC ...... *G06F 11/1076* (2013.01); *G06F 11/1004* (2013.01)

(58) Field of Classification Search
CPC ......................... G06F 11/1076; G06F 11/1004
USPC ......................................................... 714/6.24
See application file for complete search history.

(56) References Cited

U.S. PATENT DOCUMENTS 10,855,316 B2 * 12/2020 Wu ...................... H03M 13/611
11,563,450 B1 1/2023 Kanter et al.
2016/0094247 A1 * 3/2016 Parthasarathy ... H03M 13/2927 714/755
2017/0201273 A1 * 7/2017 Bonke ................. G06F 11/1068
2017/0255517 A1 * 9/2017 Achtenberg ............ G06F 3/064
2017/0255518 A1 * 9/2017 Achtenberg ...... H03M 13/2927
2018/0091172 A1 * 3/2018 Ilani .................... G06F 11/1068
2019/0081641 A1 3/2019 Symons et al.
2021/0376860 A1 12/2021 Kim et al.
2024/0333306 A1 * 10/2024 Lee .................. H03M 13/3707

FOREIGN PATENT DOCUMENTS

| | | | |
|---|---|---|---|
| CN | 114337685 | A | 5/2022 |
| JP | 2020042512 | A | 5/2022 |
| KR | 101716305 | B1 | 3/2017 |
| KR | 20210147686 | A | 12/2021 |

OTHER PUBLICATIONS

Motwani, R., et al., “Soft Decision Decoding of RAID Stripe for Higher Endurance of Flash Memory Based Solid State Drives”, IEEE International Conference on Computing, Networking and Communications, Apr. 2015.

Japan Patent Office, Notice for Reasons for Refusal, for Application No. JP2025-073281, Apr. 21, 2026.

* cited by examiner

*Primary Examiner* — Chae M Ko
(74) *Attorney, Agent, or Firm* — DENTONS Durham Jones Pinegar

(57) ABSTRACT

An error correction code (ECC) system of a data storage device utilizes a joint decoding scheme to correct errors in a codeword when the codeword has failed a decoding process using a first decoding scheme. The ECC system uses information derived from the second decoding scheme to generate soft bit information, or reliability information, associated with a portion of the failed codeword. The soft bit information derived from the second decoding scheme is provided to the first decoding scheme when the first decoding scheme attempts to correct or decode the failed codeword.

20 Claims, 8 Drawing Sheets

JOINT LDPC AND RAID DECODING SCHEME

BACKGROUND

Data storage devices typically include error correction capabilities to correct errors that occur when data is read from the data storage device. For example, when data is written to the data storage device, the data is encoded by an error correction code (ECC) low-density parity check (LDPC) encoder to generate redundant information. The redundant information is known as parity bits. The parity bits and the data are stored as an ECC codeword.

When the ECC codeword is read from the data storage device, a decoder, such as a LDPC decoder, decodes the codeword and corrects any errors that may be present. Typically, the LDPC decoder is used to correct random errors that occur on the data storage device.

However, a LDPC decoder cannot handle colossal errors that occur as a result of memory defects and/or failures. As such, a data storage device may also incorporate a redundant array of independent dies (RAID) storage scheme which is aimed at handling errors that occur as a result of physical defects. For example, the RAID storage scheme distributes the data, along with first parity information and second parity information, in a stripe across multiple different solid state drives (SSDs) or across multiple different memory dies in a single SSD. The parity information enables recovery of the data in the stripe in case one of the SSDs or one of the memory dies fail.

In some examples, LDPC decoding and RAID decoding are combined to increase the chances that errors are correctable. For example, if multiple pages have failed a decoding operation, the RAID-based decoding scheme is implemented on the page followed by the LDPC decoding scheme. This process is repeated for each failed page.

However, there may be situations in which the errors in the data exceed the correction capabilities of the LDPC decoder and the RAID decoder, but a bit error rate (BER) of the data is not high enough such that the entire codeword is invalid or to indicate that the memory die has failed.

Accordingly, it would be beneficial to utilize RAID parity information in an LDPC decoding scheme to enable the LDPC decoding scheme to correct data having a high BER.

SUMMARY

The present disclosure describes an error correction code (ECC) system for a data storage device. The ECC system utilizes a joint decoding scheme to correct errors in a codeword (or a flash memory unit (FMU)) when at least one codeword or FMU has failed an initial decoding process. For example, when the codeword has failed the initial decoding process utilizing a first decoding scheme (e.g., a LDPC decoding scheme), information derived from or otherwise associated with a second decoding scheme (e.g., a RAID decoding scheme) is used to generate soft bit information or reliability information associated with a portion of the failed codeword. The soft bit information derived from the second decoding scheme is provided to the first decoding scheme and the first decoding scheme attempts to decode the previously failed codeword. Thus, the information derived from or associated with the second decoding scheme is usable to correct random errors that cannot be corrected using the first decoding scheme or when the number of memory defects is less than (or greater than) the correction capability of the second decoding scheme but there are no memory defects.

Accordingly, examples of the present disclosure describe a method that includes determining a codeword has failed a first decoding process using a first decoding scheme. Based, at least in part, on determining the codeword has failed the first decoding process using the first decoding scheme, first parity information and second parity information associated with a portion of the codeword is identified. In an example, the first parity information and the second parity information are associated with a second decoding scheme. A reliability of the portion of the codeword is adjusted based, at least in part, on the first parity information and the second parity information. The reliability of the portion of the codeword is then provided to the first decoding scheme for a second decoding process.

Other examples describe a data storage device having a controller and an error correction code (ECC) system. In an example, the ECC system identifies a codeword having a number of errors that exceed a correction capability of a first decoding scheme. The ECC system also identifies first parity information and second parity information associated with the codeword. In an example, the first parity information and the second parity information are associated with a second decoding scheme. The ECC system calculates a reliability of a portion of the codeword. In an example, the reliability of the portion of the codeword is based, at least in part, on the first parity information and the second parity information. The ECC system also provides the reliability of the portion of the codeword to the first decoding scheme.

Still other examples describe a data storage device that includes a control means and an error correction means. The error correction means is operable to identify a plurality of codewords having a number of errors that exceed a correction capability of a first decoding scheme. The error correction means is also operable to determine that a number of the plurality of codewords exceeds a correction capability of a second decoding scheme. In response to the determinations, the error correction means generates a list of potential codewords using at least one portion of a stripe codeword associated with a first codeword of the plurality of codewords using the second decoding scheme. The error correction means also determines a reliability of each potential codeword in the list of codewords and provides at least one potential codeword in the list of codewords to the first decoding scheme.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
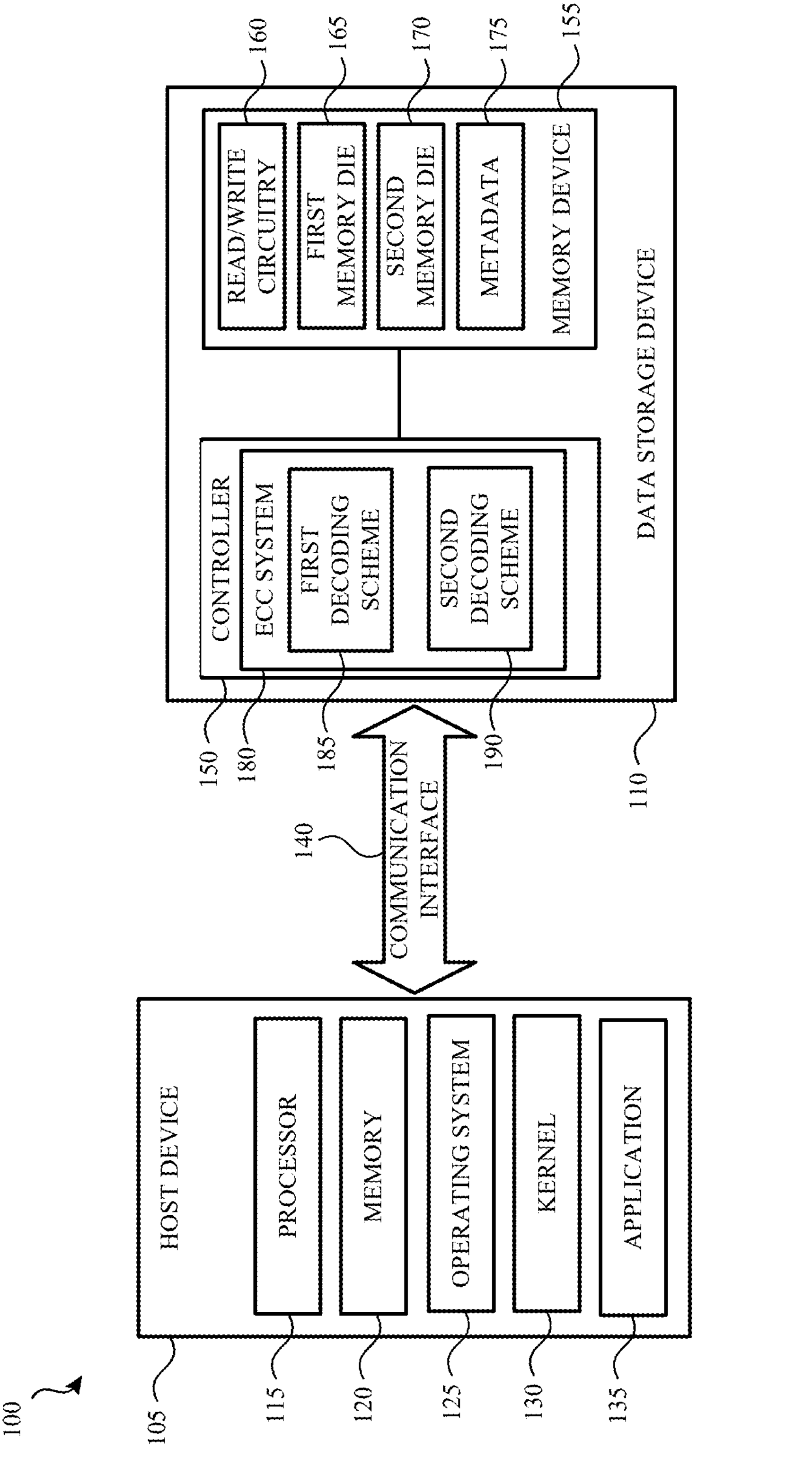
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Data storage devices include error correction capabilities to correct errors that occur when data is read from the data storage device. For example, when data is written to the data storage device, the data is encoded by an error correction code (ECC) encoder (e.g., a LDPC encoder) and parity bits are generated. The parity bits are combined with the data and stored as an ECC codeword.

When the ECC codeword is read from the data storage device, a decoder (e.g., a LDPC decoder) decodes the codeword and corrects any errors that may be present. Typically, a LDPC decoder is used to correct random errors that occur on the data storage device. For example, the LDPC decoder corrects errors up to a particular bit error rate (BER).

In some examples, the data storage device also incorporates a RAID encoding/decoding scheme. In a RAID encoding/decoding scheme, data, along with first parity information and second parity information, is distributed in a stripe (e.g., elements that have been XORed together) across multiple different solid state drives (SSDs) or across multiple memory dies in a single SSD. The parity information enables recovery of the data in the stripe in case one of the SSDs or one of the memory dies fail.

Typically, the RAID scheme is able to correct a fixed number of failures (e.g., two) within a stripe. However, there may be situations in which the errors in the codeword exceed the correction capabilities of the LDPC decoder and/or the RAID decoder. For example, a stripe may have three or more failures, and thus, not be decodable by the RAID decoder.

However, if the bit error rate (BER) of the failed codeword(s) does not exceed an error threshold (e.g., a 50% error rate, which would cause a memory die to be inoperable), but does exceed an error threshold of the LDPC decoder, a joint LDPC and RAID decoding scheme, such as the joint LDPC and RAID decoding scheme described herein, is used to correct the errors.

Specifically, the present application describes an ECC system for a data storage device. The ECC system utilizes a joint decoding scheme to correct errors in a codeword (or a flash memory unit (FMU)) when at least one codeword has failed an initial decoding process using a first decoding scheme. For example, when the codeword has failed the initial decoding process utilizing the first decoding scheme (e.g., a LDPC type decoding scheme), information derived from or otherwise associated with a second decoding scheme (e.g., a RAID decoding scheme) is used to recover the information. Thus, the information derived from or associated with the second decoding scheme is usable to correct random errors that cannot be corrected using the first decoding scheme or when the number of memory defects is less than, or greater than, the correction capability of the second decoding scheme (but there are no memory defects).

For example, when a codeword or FMU has failed the initial decoding process using the first decoding scheme, parity information associated with the second decoding scheme is used to generate or determine soft bit information. The soft bit information is provided to the first decoding scheme for subsequent decoding attempts on the failed codeword.

In accordance with the above, many technical benefits may be realized including, but not limited to, improving decoding capabilities of a first decoding scheme by using information derived from a second decoding scheme which improves the reliability of data storage devices and improves the useful life of the data storage device.

These benefits, along with other examples, will be shown and described in greater detail with respect to FIG. 1-FIG. 8.

FIG. 1 is a block diagram of a system 100 that includes a host device 105 and a data storage device 110 according to an example. In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. In an example, the controller 150 is communicatively coupled to the memory device 155. The memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. In one example, the memory cells are arranged in a two-dimensional configuration. In another example, the memory cells are arranged in a three-dimensional configuration.

In an example, the data storage device 110 is attached to or embedded within the host device 105. In another example, the data storage device 110 is implemented as an external device or a portable device that can be communicatively or selectively coupled to, and removed from, the host device 105. In yet another example, the data storage device 110 is a component (e.g., a solid-state drive (SSD)) of a network accessible data storage system, a network-attached storage system, a cloud data storage system, or the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also stores metadata 175 and includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different dies of memory may be logically linked together to form a metablock.

Figure 2A:
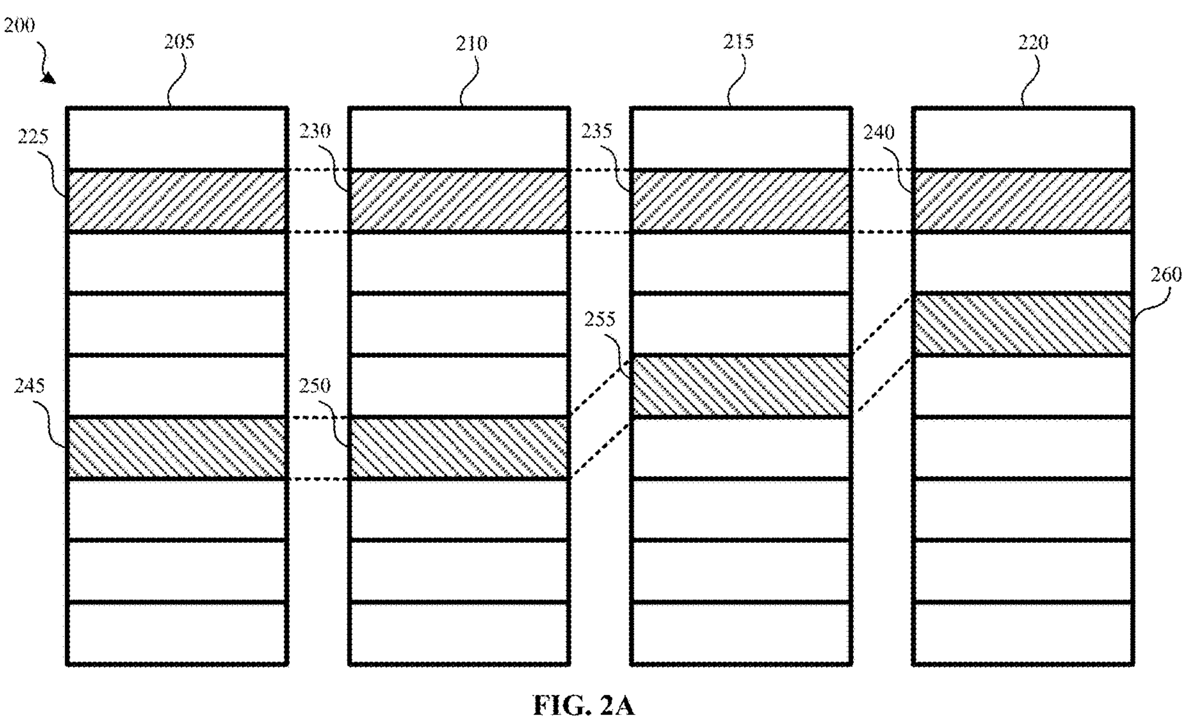
FIG. 2A illustrates how a memory device includes a number of memory blocks according to an example.

For example and referring to FIG. 2A, FIG. 2A illustrates how a memory device 200 includes a number of memory blocks according to an example. For example, the memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die. In another example, the planes are provided on two different memory dies (e.g., two planes on each memory die). In yet another example, the planes are provided on four separate memory dies. Although four planes are shown and described, the memory device 200 may have any number of planes and/or memory dies.

In an example, each plane is divided into memory blocks consisting memory cells. As shown in FIG. 2A, the rectangles represent a memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks are logically linked or grouped together (e.g., using a table in or otherwise accessible by the controller 150 (FIG. 1)) to form a metablock. A metablock is written to, read from and/or erased as a single unit. For example, memory block 225, memory block 230, memory block 235 and memory block 240 form a first metablock while memory block 245, memory block 250, memory block 255 and memory block 260 form a second metablock. The memory blocks used to form a metablock need not be restricted to the same relative locations within their respective planes.

Figure 2B:
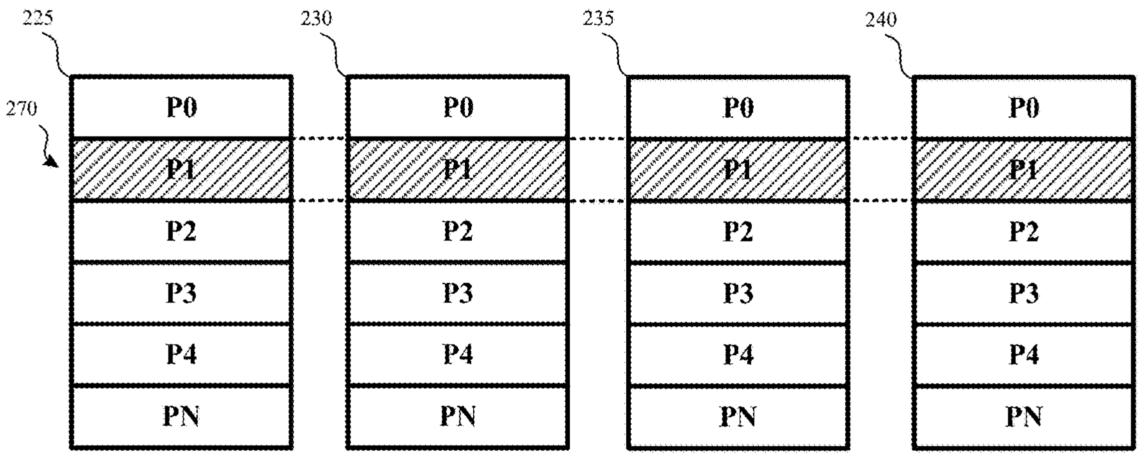
FIG. 2B illustrates how a memory block includes one or more pages according to an example.

In an example, each memory block is divided, for operational purposes, into pages of memory cells. For example and referring to FIG. 2B, FIG. 2B illustrates how a memory block includes one or more pages according to an example. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. For example, each page is further dividable into segments or units and each segment includes the fewest number of memory cells that may be written to at one time as a basic programming operation. Data that is stored in a segment or a unit of memory cells is referred to herein as a flash memory unit (FMU). A FMU may be a page, an ECC page, a codeword or otherwise include an amount of data that is written at one time during a basic programming operation and/or the amount of data that can be encoded and/or decoded by a ECC system (e.g., ECC system 180 (FIG. 1)) during a single encoding and/or decoding operation.

A metapage 270 is illustrated in FIG. 2B as being formed of one physical page from memory block 225, memory block 230, memory block 235 and memory block 240. In the example, shown, the metapage 270 includes page PI in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

As indicated above, each memory block may include any number of memory cells. The design, size, and organization of a memory block may depend on the architecture, design, and application desired for each memory die. In an example, the memory block includes a contiguous set of memory cells that share a plurality of word lines and bit lines.

Figure 2C:
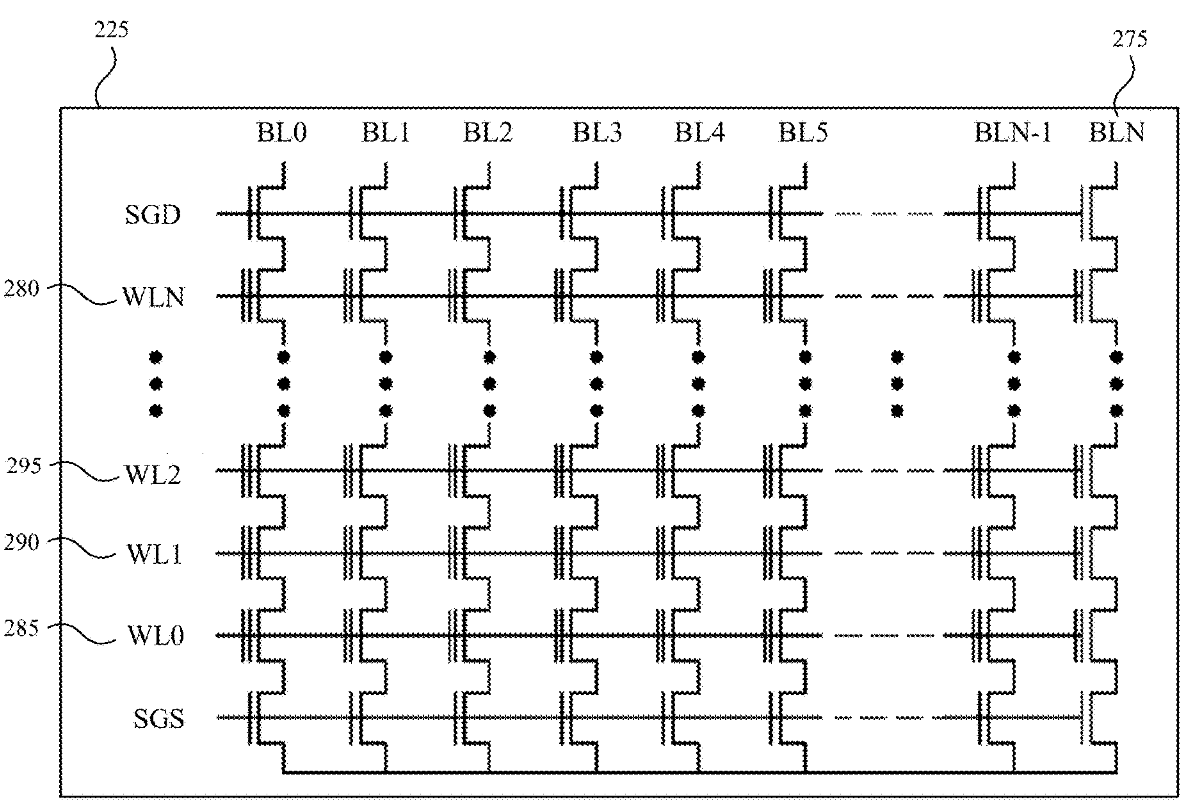
FIG. 2C illustrates how a memory block includes a number of bit lines and word lines according to an example.

FIG. 2C illustrates how a memory block includes a number of bit lines 275 and word lines 280 according to an example. For example and as shown in FIG. 2C, the memory block 225 includes bit lines BL0-BLN (collectively bit lines 275), where N is a total number of bit lines. Additionally, the memory block 225 includes word lines WL0 285, WL1 290, WL2 295-WLN (collectively word lines 280), where N is a total number of word lines. In an example, multiple memory blocks can share the same bit line.

A word line 280 may function as a single-level-cell (SLC) word line, a multi-level-cell (MLC) word line, a tri-level-cell (TLC) word line, a quad-level cell (QLC) word line, a penta-level cell (PLC) word line and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

Referring back to FIG. 1, as previously described, the data storage device 110 also includes a controller 150. Although a single controller 150 is shown and described, the data storage device 110 can include multiple controllers. In such an example, a first controller executes a first operation or set of operations and the second controller executes a second operation or set of operations. In an example, the first set of operations and the second set of operations are executed on the same memory dies. In other examples, the first set of operations is executed on a first memory die or a first set of memory dies and the second set of operations is executed on a second memory die or a second set of memory dies.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 sends data and a corresponding write command to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the read command specifies the physical address of a portion of the memory device 155 at which the data is stored. The controller 150 also tracks the number of program/erase cycles or other programming operations that have been performed on or by the memory device and/or the memory dies of the memory device 155.

The controller 150 also includes, or is otherwise associated with, a ECC system 180. In an example, the ECC system 180 is a packaged functional hardware unit designed for use with other components/systems. In another example, the ECC system 180 is a portion of a program code (e.g., software or firmware) executable by a processor or processing circuitry. In yet another example, the ECC system 180 is a self-contained hardware and/or software component that interfaces with other components and/or systems. Although the ECC system 180 is shown as being part of the controller 150, the ECC system 180 may be separate from the controller 150.

In an example, the ECC system 180 receives data to be stored to the memory device 155 and generates a codeword. For example, the ECC system 180 includes an encoder that encodes received data using a first encoding scheme. In an example, the first encoding scheme is an ECC encoding scheme, such as a Reed-Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof.

For example, when the data is received from the host device 105, the ECC system 180 encodes the data into one or more codewords. The codewords are then stored in the memory device 155 (or another location). For example, when the data is received, the data is partitioned into N data words. A first portion of the data corresponds to a first data word and an Nth data word corresponds to a last data word of the data. The ECC system 180 encodes the first data word to generate a first codeword (that includes data and associated parity bits) and encodes a second data word to generate a second codeword. This repeats for all N data words.

Additionally, the ECC system 180 includes an encoder that encodes data according to a second encoding scheme. In an example, the second encoding scheme is a RAID (e.g., RAID 6) or XOR encoding scheme that generates stripe parity data or stripe codewords. For example, when codewords corresponding to the N data words have been generated (e.g., resulting in N codewords), the ECC system 180 utilizes the second encoding scheme to generate stripe codewords that corresponds to multiple columns of multiple bits from each of the N codewords. For example, the ECC system 180 is configured to generate first parity data that corresponds to a first stripe codeword by encoding first portions (e.g., 8 bits) of each of the N codewords. The ECC system 180 generates a second stripe codeword by encoding second portions of each of the N codewords. This process repeats for each portion of each of the codewords.

In an example, the parity information for the stripe codewords is represented as P parity information and Q parity information. The P parity information and the Q parity information are calculated using the following equation:

$$\begin{cases} P = x_0 \oplus x_1 \oplus x_2 \oplus \ldots \oplus x_{q-1} \\ Q = x_0 \oplus \alpha x_1 \oplus \alpha^2 x_2 \oplus \ldots \oplus \alpha^{q-1} x_{q-1} \end{cases}$$

As shown in the equation above, the P parity information is a XOR operation between data symbols marked as $x_i$. The Q parity information is calculated by multiplying each data symbol with the power of α, which constitutes a codebook of a Reed-Solomon code or other encoding algorithm associated with the second encoding scheme.

Figure 3:
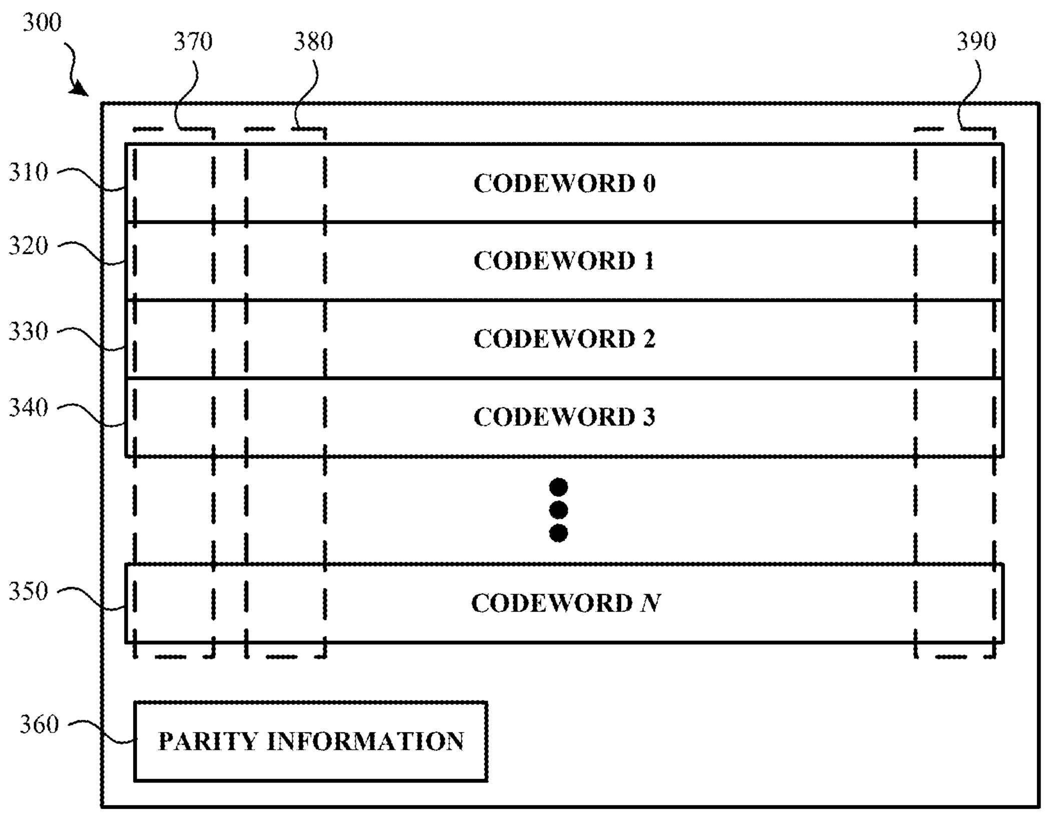
FIG. 3 illustrates a data structure storing a plurality of codewords, a plurality of stripe codewords, and parity information according to an example.

When (or as) the codewords and the stripe codewords have been generated, the codewords, the stripe codewords, and the parity information are stored in a data structure. For example and referring to FIG. 3, FIG. 3 illustrates a data structure 300 storing a plurality of codewords, a plurality of stripe codewords, and parity information 360 according to an example. As shown in FIG. 3, the data structure 300 includes multiple codewords. For example, the data structure 300 includes N codewords including Codeword 0 310, Codeword 1 320, Codeword 2 330, Codeword 3 340 and Codeword N 350. Although five codewords are shown and described, the data structure 300 can include any number of codewords.

As previously explained, the data structure 300 also includes one or more stripe codewords (represented by the dashed rectangles). For example, the data structure 300 incudes a first stripe codeword 370, a second stripe codeword 380 and a M stripe codeword 390. In an example, M is any number greater than one.

In an example, the first stripe codeword 370 includes a first portion of Codeword 0 310, a first portion of Codeword 1 320, a first portion of Codeword 2 330, a first portion of Codeword 3 340 and a first portion of Codeword N 350. The first portions of the codewords are encoded using a stripe encoding scheme (e.g., a Reed-Solomon encoding scheme) on a single symbol (e.g., 8-bit) chunk) to generate parity information 360 (e.g., P parity information and Q parity information) that corresponds to the first stripe codeword 370.

Likewise, the second stripe codeword 380 includes a second portion of Codeword 0 310, a second portion of Codeword 1 320, a second portion of Codeword 2 330, a second portion of Codeword 3 340 and a second portion of Codeword N 350. Parity information 360 associated with the second stripe codeword is also generated such as previously described.

Referring back to FIG. 1, the ECC system 180 also includes a first decoder that decodes data or codewords using a first decoding scheme 185 and a second decoder that decodes data or codewords using a second decoding scheme 190. In an example, the first decoding scheme 185 is an LDPC decoding scheme and the second decoding scheme 190 is a RAID (e.g., RAID 6) or XOR decoding scheme. In another example, the first decoding scheme is a RAID decoding scheme and the second decoding scheme is a LDPC decoding scheme. Although specific decoding schemes are mentioned, other encoding and/or decoding schemes may be used. In an example, the first decoding scheme 185 is used to decode the generated codewords and the second decoding scheme 190 is used to decode the stripe codewords.

In an example, when the codewords are decoded, the ECC system 180 may determine that the codewords include various errors. In some examples, the number of errors detected or identified in the codeword may exceed the correction capabilities of the first decoding scheme 185 and/or the second decoding scheme 190. However, the errors do not reach a level in which the entire codeword is invalid. In such examples, a joint decoding scheme is used to correct the errors. In an example, the joint decoding scheme utilizes the first decoding scheme 185 and the second decoding scheme 190 to correct various errors that are detected by the ECC system 180.

For example, the second decoding scheme 190 is used to generate reliability information (also referred to as soft bit information or soft information) for different portions of a stripe codeword associated with the failed codeword. The reliability information is then provided to the first decoding scheme 185 during subsequent attempts to correct the failed codeword.

In an example, each of the codewords are on separate pages of the memory device 155. As such, each of the codewords can be decoded independently of the other codewords. For example and referring back to FIG. 3, Codeword 0 310 includes parity bits that are used by the ECC system (e.g., ECC system 180 (FIG. 1)) to correct bit errors up to the correction capability of a first decoding scheme (e.g., the first decoding scheme 185 (FIG. 1)). Likewise, Codeword 1 320 includes parity bits that are used by the ECC system to correct bit errors that are identified in Codeword 1 320.

However, if one or more of the codewords include bit errors that exceed the correction capability of the first decoding scheme, but do not reach a level in which the entire codeword is invalid, the ECC system uses the parity information 360 associated with a second decoding scheme (e.g., a second decoding scheme 190 (FIG. 1) or a RAID 6 decoding scheme) to generate soft bit information that can be used to correct the failed codewords.

For example, when one or more of the codewords in the data structure 300 have failed a decoding process using the first decoding scheme, the ECC system reads the remaining codewords from the data structure 300 and attempts to decode the remaining codewords. In an example, the ECC system will decode the remaining codewords that belong to a particular stripe. The ECC system will then proceed to decode the failed codewords and/or generate the various parities (e.g., the P parity information and/or the Q parity information.

If the number of failed codewords in the data structure 300 is less than or equal to a correction capability of the second decoding scheme (e.g., the second decoding scheme 190 (FIG. 1)), the second decoding scheme may be used to generate soft bit information, or reliability information, associated with each stripe codeword. In another example, the decoding scheme described herein may also be used when the number of failed codewords in the data structure exceed the correction capabilities of the second decoding scheme, so long as the number of errors and/or a BER of the failed codewords does not exceed an error threshold such that the memory die is invalid. The soft bit information is used to correct one or more of the failed codewords in an iterative manner such as will be described in greater detail herein.

In another example, when one codeword in the data structure 300 has failed the decoding process using the first decoding scheme, the ECC system performs iterative decoding using the first decoding scheme and the second decoding scheme. For example, the ECC system exchanges information between the first decoding scheme and the second decoding scheme to generate soft information or a reliability score associated with a portion of the failed codeword. For example, the parity information associated with the second decoding scheme (e.g., the P parity information and/or the Q parity information) is used to determine a reliability, or a log likelihood ratio (LLR) (e.g., the probability that a particular bit is a "1" or a "0"), of a particular bit or portion in the failed codeword.

For example, the ECC system receives or determines the P parity information of a particular bit or page of the failed codeword (or portion of the codeword) and reliability information associated with the codeword. The ECC system then compares the P parity information of the particular bit or page with hard bit information associated with the particular bit and/or page of the failed codeword. If the P parity information and the hard bit information agree, the LLR (or the reliability) associated with the particular bit or portion of the codeword (e.g., the portion of the stripe codeword associated with the failed codeword) is increased. However, if the hard bit information associated with the particular bit of the codeword and the P parity information disagree, the reliability of the particular bit or portion of the codeword is decreased.

In another example, the LLR or the reliability score of the particular bit and/or page associated with the failed codeword is based, at least in part, on the P parity information associated with a particular bit, the Q parity information associated with the particular bit and original hard bit and soft bit information of the particular bit that is sensed from the memory device. For example, for each bit index i in the failed codeword or portion of the failed codeword, soft bit information and hard bit information of the bit i is sensed from the memory. This is represented by the following equation:

$$HB_i + SB_i \text{ (sensed from the memory)}$$

The P parity information associated with the bit i and the Q parity information associated with bit i are also recreated or are otherwise determined. In an example, the P parity information associated the bit i and the Q parity information associated with the bit i are generated by the following equations (which are inverse equations to the equations previously described for generating the P parity information and the Q parity information):

$$\hat{x}_i^p = P \oplus x_0 \oplus x_1 \ldots \oplus x_{i-1} \oplus x_{i+1} \ldots \oplus x_{q-1}$$

$$\hat{x}_i^q = (Q \oplus x_0 \oplus \alpha x_1 \ldots \oplus \alpha^{i-1} x_{i-1} \oplus \alpha^{i+1} x_{i+1} \ldots \oplus x_{q-1})\alpha^{-i}$$

When the P parity information and the Q parity information for the particular bit i have been determined, the value for P and the value for Q are compared. In examples in which the P value and the Q value disagree for the particular bit i, the original LLR or reliability of the particular bit i is unchanged.

However, in examples in which the P value and the Q value for the particular bit i agree or are the same, the values for P and/or Q are compared against the hard bit value for the particular bit i. If the values for P and/or Q agree with the hard bit value for the particular bit i, the original LLR or reliability of the particular bit i is increased. In an example, the magnitude of the LLR is based, at least in part, on the soft bit of the particular bit i that is sensed from the memory device and the sign of the LLR is based, at least in part, on the hard bit of the particular bit i.

In another example, the P value and the Q value for the particular bit i may agree or are the same, but the values for P and/or Q do not agree with the hard bit value for the particular bit i. In such an example, the original LLR or reliability of the particular bit i is decreased.

The determination as to whether the LLR of the particular bit i should be increased or decreased is represented by the following equation in which BER; is the underlying BER of the particular bit i.

$$LLR_i = \log((1 - BER|HB_i + SB_i, \hat{x}_i^p, \hat{x}_i^q)/(BER|HB_i + SB_i, \hat{x}_i^p, \hat{x}_i^q))$$

When the LLR is determined for the particular bit i, the newly updated LLR may be used by the first decoding scheme to decode the particular codeword. For example, the newly updated LLR of the particular bit i is provided to the first encoding scheme during subsequent decoding attempts of the failed codeword. This process repeats in an iterative manner between the failed codeword and the stripe codeword until the codeword is corrected or a timeout condition occurs.

In an example, the ECC system 180 can correct up to two failed codewords using the above-described decoding technique. For example, each of the codewords may be encoded using the first encoding scheme (e.g., LDPC encoding) and each of the stripe codewords may be encoded using a second encoding scheme (e.g., a Reed-Solomon encoding scheme). As previously described, the first decoding scheme 185 may include a LDPC decoding scheme and the second decoding scheme 190 may include a Reed-Solomon erasure correction scheme. Although LDPC and Reed-Solomon schemes are described, each of the codewords may be encoded/decoded using a different encoding/decoding scheme (e.g., a BCH scheme) and each of the stripe codewords may be encoded/decoded using a different stripe encoding/decoding scheme (e.g., another BCH scheme).

For example, when a codeword fails a decoding operation using the first decoding scheme 185, a symbol of the stripe codeword associated with the failed code word is erased. The erasure decoding algorithm can then be used to determine the correct value of the symbol.

For example, and referring back to FIG. 3, if Codeword 0 310 and Codeword 1 320 failed a decoding process using the first decoding scheme, the second decoding scheme would determine the portion of the first stripe codeword 370 associated Codeword 0 310 and determine the portion of the first stripe codeword 370 associated with Codeword 1 320. This process would be repeated for each stripe codeword in the data structure 300

However, there may be situations in which more than two codewords have failed decoding. For example, Codeword 0 310, Codeword 1 320, Codeword 2 330, Codeword 3 340 and Codeword N 350 may have all failed a decoding process using the first decoding scheme 185. In this example, the codewords failed due to random errors exceeding the correction capabilities of the first decoding scheme 185 but were not caused by a memory defect in which the entire codeword is corrupt. For example, a BER of the codewords may be between 1% and 10%. Although a specific range of BERs is mentioned, any BER may be used. However, in some examples, the BER is not higher than 50% (although this is not required).

In the following example, the ECC system 180 utilizes a Reed-Solomon decoding scheme (or an erasure decoding scheme) that uses symbols (e.g., eight bit symbols) to group data. The erasure decoding algorithm is also configured to deterministically correct up to t symbol erasures during a decoding phase. In this example, t=2.

As previously described, in this example, there are five codewords that have failed decoding-Codeword 0 310, Codeword 1 320, Codeword 2 330, Codeword 3 340 and Codeword N 350. As such, a list of a list of $$\binom{5}{2}$$

potential codewords are generated. For example, the list of potential codewords is generated by erasing every pair of two out of the five portions of each stripe codeword that correspond to failed codeword.

Figure 4A:
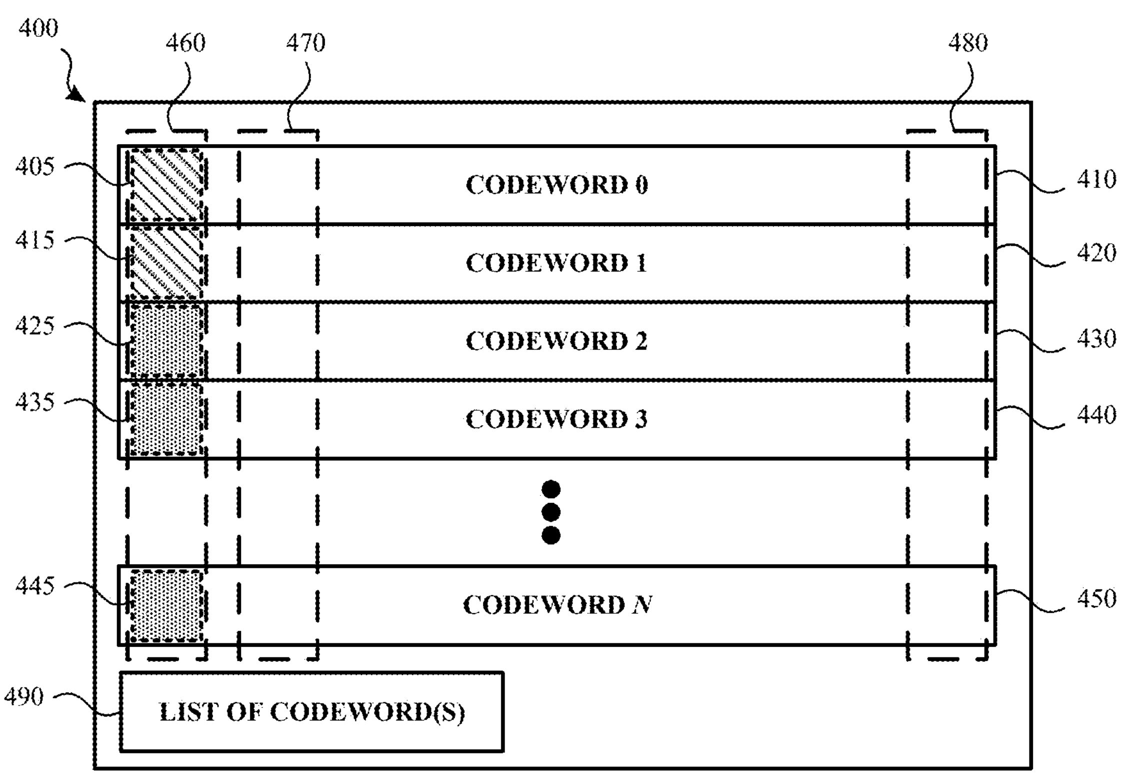
FIG. 4A illustrates how different portions of a stripe codeword that correspond to a failed codeword are erased and potential codewords are determined according to an example.
Figure 4B:
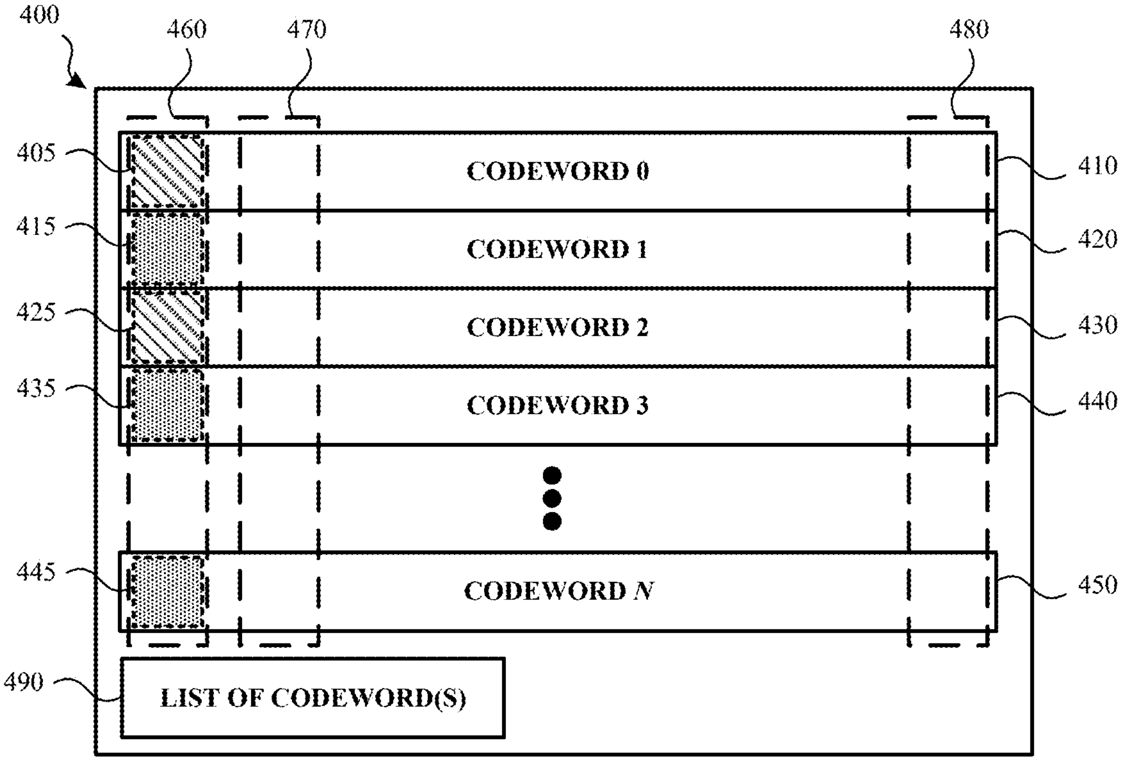
FIG. 4B illustrates how different portions of a stripe codeword that correspond to a failed codeword are erased and potential codewords are determined according to another example.

For example and referring to FIG. 4A, FIG. 4A illustrates how different portions of a stripe codeword that correspond to a failed codeword are erased and potential codewords are determined according to an example. In this example, a data structure 400 includes N codewords—Codeword 0 410, Codeword 1 420, Codeword 2 430, Codeword 3 440 and Codeword N 450. In an example, the data structure 400 is similar to the data structure 300 shown and described with respect to FIG. 3. Although five codewords are shown and described, the data structure 400 can include any number of codewords. The data structure 400 also includes one or more stripe codewords (represented by the dashed rectangles). For example, the data structure 400 incudes a first stripe codeword 460, a second stripe codeword 470 and a M stripe codeword 480. In an example, M is any number greater than one.

The first stripe codeword 460 includes a first portion 405 of Codeword 0 410, a first portion 415 of Codeword 1 420, a first portion 425 of Codeword 2 430, a first portion 435 of Codeword 3 440 and a first portion 445 of Codeword N 450. In an example, each of the first portions of the stripe codewords are encoded using a stripe encoding scheme (e.g., a Reed-Solomon) scheme on a 8-bit chunk to generate a symbol. In an example, each of the other stripe codewords include similar portions of each codeword. For example, the second stripe codeword 470 includes a second portion of Codeword 0 410, a second portion of Codeword 1 420, a second portion of Codeword 2 430, a second portion of Codeword 3 440 and a second portion of Codeword N 450.

To generate a first potential codeword for the list of codewords 490, a first portion and a second portion of the first stripe codeword 460 are erased. A decoding operation using second decoding scheme (e.g., a Reed-Solomon decoding scheme) is then used to decode and/or correct the first stripe codeword 460. This process is then repeated for each pair of portions in the first stripe codeword 460.

For example, in a first iteration, the first portion 405 of Codeword 0 410 associated with the first stripe codeword 460 and the first portion 415 of Codeword 1 420 associated with the first stripe codeword 460 are erased. The second decoding scheme is then applied to the first portion 425 of Codeword 2 430, the first portion 435 of Codeword 3 440 and the first portion 445 of Codeword N 450 to generate a first potential codeword. The first potential codeword is stored in the list of codewords 490.

In a second iteration (shown in FIG. 4B), the first portion 405 of Codeword 0 410 associated with the first stripe codeword 460 and the first portion 415 of Codeword 2 430 associated with the first stripe codeword 460 are erased. The second decoding scheme is then applied to the first portion 425 of Codeword 1 420, the first portion 435 of Codeword 3 440 and the first portion 445 of Codeword N 450 to generate a second potential codeword. The second potential codeword is stored in the list of codewords 490. This process is repeated for each pair of portions of the first stripe codeword 460. In an example, this process generates soft bit information associated with each of the portions.

The above-described process continues for each of the other stripe codewords in the data structure 400. For example, the above-described process continues for the second stripe codeword 470 and the M stripe codeword 480. In an example, when all of the stripe codewords have been traversed, each of the failed codewords in the data structure 400 can be decoded using the soft information that was generated.

In an example, there are two approaches for generating soft information based on the list of codewords 490—a maximum likelihood approach and a maximum a posteriori approach. Each of these will be discussed in greater detail below.

In the maximum likelihood approach, the list of codewords 490 is on a symbol level for each of the symbols. For example, the list of codewords 490 is sorted such that symbols having the "worst" (or most) amount of data being erased (e.g., symbols associated with a codeword having the highest BER) are on top of the list. As a result, the chance that the remaining failed data will be decoded in a subsequent decoding operation (e.g., a LDPC decoding operation) will succeed using the determined soft bit information.

For example and in order to save latency, the ECC system 180 selects and corrects codewords in which errors are more probable when compared with other codewords. As a result, the remaining codewords may be easier to decode using additional soft bit information.

For example, symbol values for each portion of the stripe codewords are compared to the original channel HB+SB LLRs. The closest values are selected for each of the symbols (e.g., using Euclidian distance). Another iteration of decoding (e.g., LDPC decoding) using a second codeword in the list of codewords 490 would commence. In the second iteration, soft bit information and/or an updated LLRs associated with the symbols and/or portions of the codeword may be used.

In the maximum a posteriori approach all of the codewords may be used together. For example, when the list of codewords 490 is created (such as previously described), all of the codewords that assume a "1" for a particular bit are called CI while all of the codewords that assume "0" for the particular bit are called CO. The ECC system 180 then determines the probabilities to receive those bits. The probabilities are used to determine the LLR of each bit and/or codeword. In an example, the LLR is determined using the following equation:

$$LLR_{MAP} = \log\frac{\Sigma_{C\in C_0} Pr(HB+SB|C)}{\Sigma_{C\in C_1} Pr(HB+SB|C)}$$

When the LLRs have been determined, decoding using the first decoding scheme 185 would commence using the updated LLR. For example, the LLRs associated with the various stripe codewords may be used to decode the various failed codewords. This process can be repeated and/or performed iteratively. For example, decoding using the first decoding scheme 185 would commence, followed by the second decoding scheme 190, followed again by the first decoding scheme.

Figure 5:
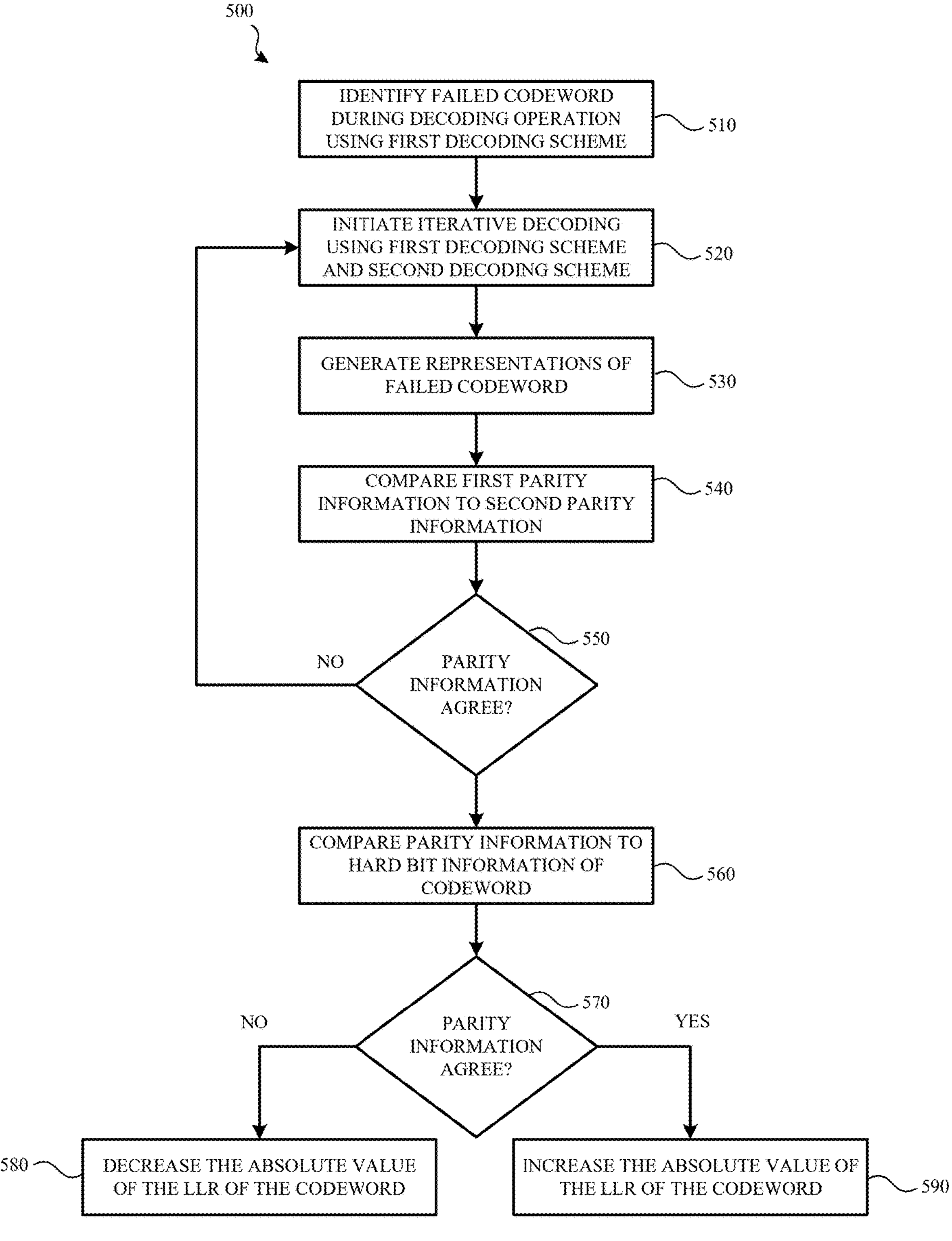
FIG. 5 illustrates a method for using a joint decoding scheme to decode a failed codeword according to an example.

FIG. 5 illustrates a method 500 for using a joint decoding scheme to decode a failed codeword according to an example. In an example, the method 500 is executed by an ECC system such as, for example, the ECC system 180 shown and described with respect to FIG. 1.

In an example, the method 500 begins during a decoding operation. For example, a codeword may be decoded using a first decoding scheme (e.g., a LDPC decoding scheme). In this example, the codeword that is being decoded using the first decoding scheme has failed the decoding process and is identified (510) as a failed codeword. In an example, the codeword has failed based on various random errors such that a BER of the codeword exceeds the correction capabilities of the first decoding scheme.

When the codeword has been identified as a failed codeword, the ECC system initiates (520) iterative decoding using a first decoding scheme and a second decoding scheme. For example, the ECC system generates reliability information or soft bit information for each portion or bit of the codeword that failed the decoding process. In an example, the reliability information of the soft bit information is generated using the second decoding scheme.

For example, for each portion or bit of the failed codeword, the ECC system generates (530) representations of the failed codeword. For example, the ECC determines hard bit information and soft bit information associated with the bit. In an example, the hard bit information and the soft bit information is sensed from the channel and/or the memory device.

In another example, the ECC system also receives and/or determines P parity information of a particular bit or page of the failed codeword (or portion of the codeword) and Q parity information associated with the particular bit or page of the failed codeword such as previously described.

When the P parity information and the Q parity information for the particular bit have been determined, the ECC system compares (540) the value for P and the value for Q. The ECC system then determines (550) whether the parity information or values agree. If the ECC system determines that the values for P value and Q disagree, the original LLR or reliability of the particular bit is unchanged and the process repeats for the next bit or portion of the codeword.

However, if the ECC system determines (550) that the P value and the Q value agree or are the same, the ECC system compares (560) the values for P and/or Q against the hard bit value for the particular bit. Based on the comparison, the ECC system either increases or decreases the LLR of the particular bit.

For example, if the values for P and/or Q agree with the hard bit value for the particular bit, the ECC system increases the absolute value of (590) the original LLR or reliability of the particular bit. However, if the ECC system determines that the values for P and/or Q do not agree with the hard bit value for the particular bit, the ECC system decreases the absolute value (580) the LLR of the particular bit. The method 500 may then be repeated. When the LLR is determined for the particular bit, the newly updated LLR may be used by the first decoding scheme to decode the particular codeword and the method 500 may be repeated.

Figure 6:
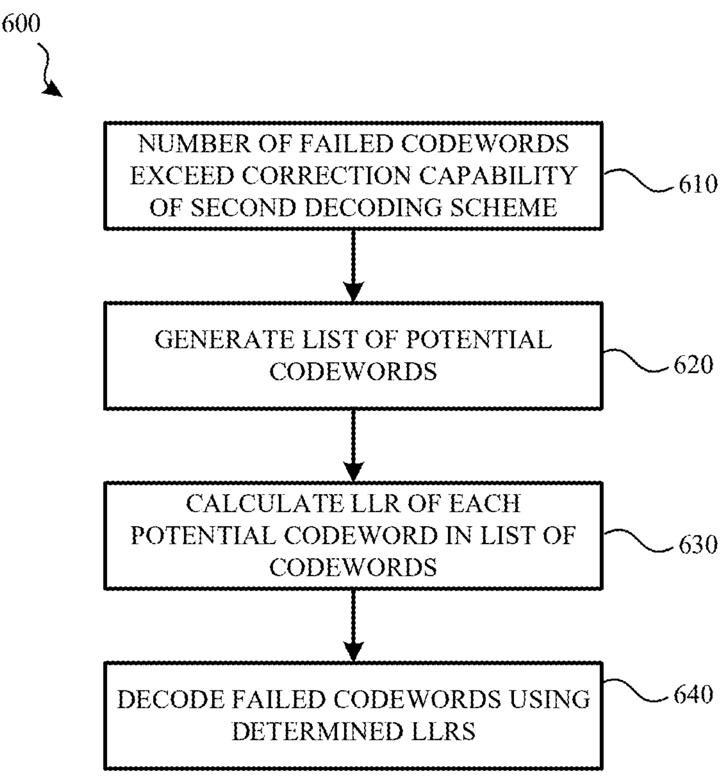
FIG. 6 illustrates a method for using a joint decoding scheme to decode multiple failed codewords according to an example.

FIG. 6 illustrates a method 600 for using a joint decoding scheme to decode multiple failed codewords according to an example. In an example, the method 600 is executed by an ECC system such as, for example, the ECC system 180 shown and described with respect to FIG. 1. In the example shown and described with respect to FIG. 6, the multiple codewords have failed the decoding process using a first decoding scheme. Additionally, the codewords have failed due to random errors exceeding the correction capabilities of the first decoding scheme but were not caused by a memory defect in which the entire codeword is corrupt. Additionally, the number of failed codewords exceed a number of codewords that can be corrected using a second decoding scheme.

For example, method 600 begins during a decoding operation in which the ECC system determines (610) that a number of failed codewords exceeds the correction capabilities of the second decoding scheme. For example, the second decoding scheme may support decoding of n codewords, where n is greater than 1. However, the ECC system may determine that during a first decoding operation using a first decoding scheme that m codewords have failed the decoding operations, where m is greater than n.

In such an example, the ECC system generates (620) a list of potential codewords. In an example, the list of potential codewords is represented as a list of $$\binom{m}{n}.$$

In an example and as previously described, the list of potential codewords is generated by erasing every pair of two out of the five portions of each stripe codeword that corresponds to a failed codeword. For example, a data structure incudes a X codewords and Y stripe codewords. A first stripe codeword includes a first portion of a first codeword, a first portion of a second codeword and a first portion of the X codeword. Each of the first portions of the stripe codewords are encoded using a stripe encoding scheme. Each of the other Y stripe codewords include similar portions of each of the X codewords such as previously described.

To generate the list of potential codewords, various portions of each stripe codeword are erased. A decoding operation using a second decoding scheme (e.g., a Reed-Solomon decoding scheme) is then used to generate a potential codeword. For example, the first portion and the second portion of the first stripe codeword are erased. The decoding operation using the second decoding scheme is then used to generate, decode and/or correct the first stripe codeword. This process is then repeated for each pair of portions in the first stripe codeword. In an example, this process generates soft bit information associated with each of the portions.

Soft information, or LLR information, is then calculated (630) for each potential codeword in the list of potential codewords. In an example and as previously described, there are two approaches for generating soft information based on the list of codewords—a maximum likelihood approach and a maximum a posteriori approach.

When the LLR of each potential codeword in the list of potential codewords has been determined, a failed codeword (or multiple failed codewords) can be decoded (640) using the newly determined LLRs.

Figures 7, 8:
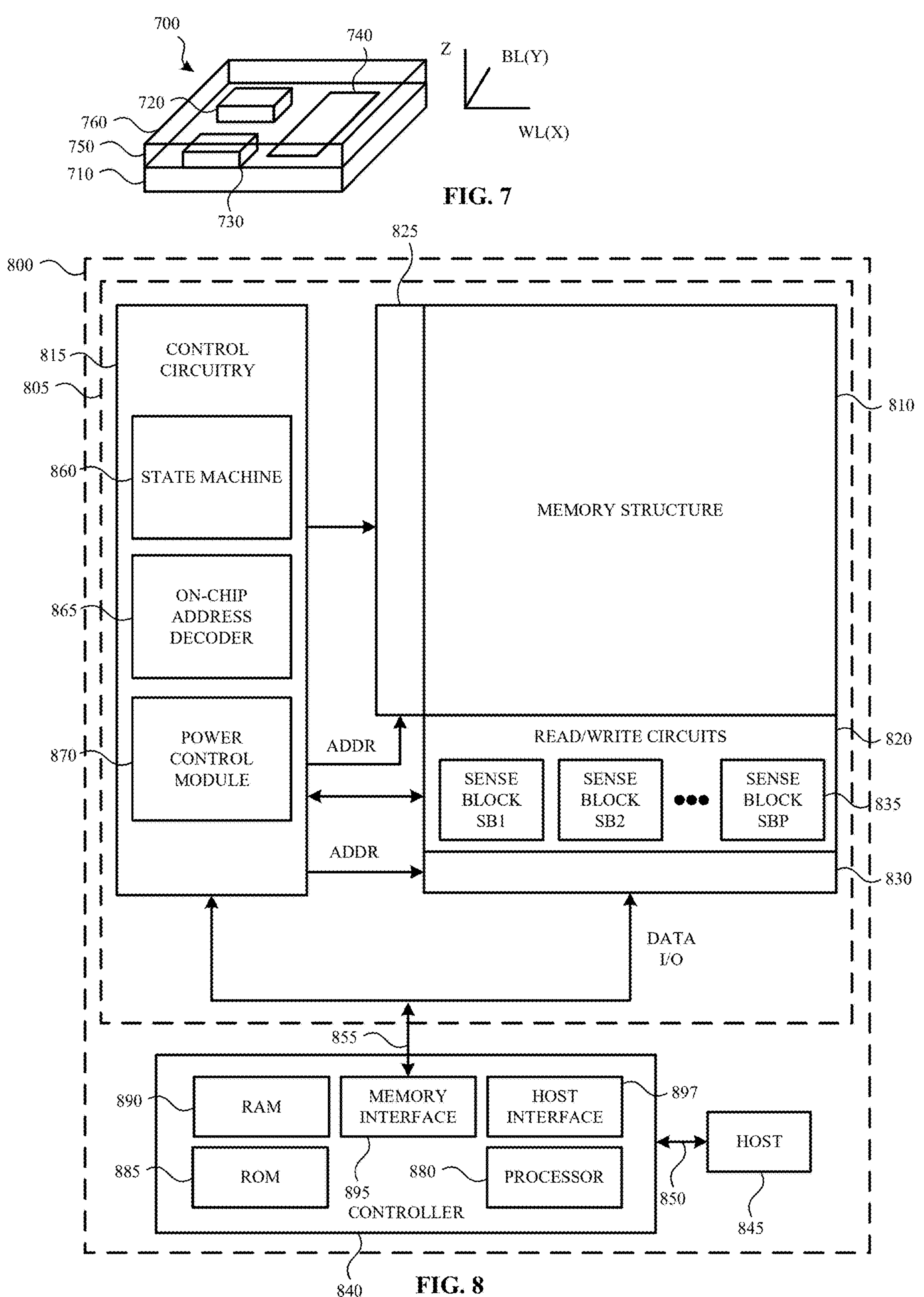
FIG. 7 is a perspective view of a storage device that includes three-dimensional (3D) stacked non-volatile memory according to an example.
FIG. 8 is a block diagram of a storage device according to an example.

FIG. 7-FIG. 8 describe example storage devices that may be used with or otherwise implement the various features described herein. For example, the storage devices shown and described with respect to FIG. 7-FIG. 8 may include various systems and components that are similar to the systems and components shown and described with respect to FIG. 1. For example, the controller 840 shown and described with respect to FIG. 8 may be similar to the controller 150 of FIG. 1. Likewise, the memory dies 805 may be similar to the first memory die 165 and/or the second memory die 170 of FIG. 1.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks include a first block (BLK0 720) and a second block (BLK1 730). Each block is formed of memory cells (e.g., non-volatile memory elements). The substrate 710 also includes a peripheral area 740 having support circuits that are used by the first block and the second block.

The substrate 710 also carries circuits under the blocks, along with one or more lower metal layers which are patterned in conductive paths to carry signals from the circuits. In an example, the blocks are formed in an intermediate region 750 of the storage device 700. The storage device also includes an upper region 760. The upper region 760 includes one or more upper metal layers that are patterned in conductive paths to carry signals from the circuits. Each block of memory cells includes a stacked area of memory cells. In an example, alternating levels of the stack represent word lines. While two blocks are depicted, additional blocks may be used and extend in the x-direction and/or the y-direction.

In an example, a length of a plane of the substrate 710 in the x-direction represents a direction in which signal paths for word lines or control gate lines extend (e.g., a word line or drain-end select gate (SGD) line direction) and the width of the plane of the substrate 710 in the y-direction represents a direction in which signal paths for bit lines extend (e.g., a bit line direction). The z-direction represents a height of the storage device 700.

FIG. 8 is a functional block diagram of a storage device 800 according to an example. In an example, the storage device 800 is similar to the 3D stacked non-volatile storage device 700 shown and described with respect to FIG. 7. In an example, the components depicted in FIG. 8 are electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by word lines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805. Although a single controller 840 is shown, the storage device 800 can include multiple controllers with each controller responsible for different operations described herein.

Commands and data are transferred between a host 845 and the controller 840 using a data bus 850. Additionally, commands and data are transferred between the controller 840 and one or more of the memory dies 805 by way of lines 855. In one example, the memory die 805 includes a set of input and/or output (I/O) pins that connect to lines 855.

The memory structure 810 also includes one or more arrays of memory cells. The memory cells are arranged in a three-dimensional array or a two-dimensional array. The memory structure 810 includes any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 also includes a state machine 860, an on-chip address decoder 865 and a power control module. The state machine 860 provides chip-level control of various memory operations, such as selecting a memory block for programming. The state machine 860 is programmable by software. In another example, the state machine 860 does not use software and is completely implemented in hardware (e.g., electrical circuits).

The on-chip address decoder 865 provides an address interface between addresses used by host 845 and/or the controller 840 to a hardware address used by the first decoder 825 and the second decoder 830. The power control module 870 controls power and voltages that are supplied to the word lines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815, the state machine 860, the on-chip address decoder 865, the first decoder 825, the second decoder 830, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 897, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more word lines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die 805, using the memory interface 895. The host interface 897, in communication with the ROM 885, the RAM 890, and the one or more processors 880, may be an electrical circuit that provides an electrical interface between the controller 840 and the host 845. For example, the host interface 897 may change the format or timing of signals, provide a buffer, isolate from surges, latch I/O, and so on. Commands and data from the host 845 are received by the controller 840 by way of the host interface 897. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Accordingly, examples of the present disclosure describe a method, comprising: determining a codeword has failed a first decoding process using a first decoding scheme; based, at least in part, on determining the codeword has failed the first decoding process using the first decoding scheme, identify first parity information and second parity information associated with a portion of the codeword, the first parity information and the second parity information being associated with a second decoding scheme; adjusting a reliability of the portion of the codeword based, at least in part, on the first parity information and the second parity information; and providing the reliability of the portion of the codeword to the first decoding scheme for a second decoding process. In an example, the first decoding scheme is a low-density parity check (LDPC) decoding scheme. In an example, the second decoding scheme is a redundant array of independent dies (RAID) decoding scheme. In an example, the first parity information is based, at least in part, on a XOR operation performed on different portions of a stripe codeword associated with the codeword. In an example, the second parity information is based, at least in part, on multiplying different portions of a stripe codeword associated with the codeword with a codebook associated with the second decoding scheme. In an example, the reliability of the portion of the codeword is adjusted when the first parity information agrees with the second parity information. In an example, the method also includes increasing the reliability of the portion of the codeword based, at least in part, on a determination that the first parity information and the second parity information agree with hard bit information associated with the codeword. In an example, the method also includes decreasing the reliability of the portion of the codeword based, at least in part, on a determination that the first parity information and the second parity information disagree with hard bit information associated with the codeword.

Examples also describe a data storage device, comprising: a controller; and an error correction code (ECC) system associated with the controller and operable to: identify a codeword having a number of errors that exceed a correction capability of a first decoding scheme; identify first parity information and second parity information associated with the codeword, the first parity information and the second parity information being associated with a second decoding scheme; calculate a reliability of a portion of the codeword based, at least in part, on the first parity information and the second parity information; and provide the reliability of the portion of the codeword to the first decoding scheme. In an example, the first parity information is based, at least in part, on a XOR operation performed on different portions of a stripe codeword associated with the codeword. In an example, the second parity information is based, at least in part, on multiplying different portions of a stripe codeword associated with the codeword with a codebook associated with the second decoding scheme. In an example, calculating the reliability of the portion of the codeword comprises adjusting the reliability of the portion of the codeword when the first parity information agrees with the second parity information. In an example, calculating the reliability of the portion of the codeword further comprises increasing the reliability of the portion of the codeword based, at least in part, on a determination that the first parity information and the second parity information agree with hard bit information associated with the codeword. In an example, calculating the reliability of the portion of the codeword further comprises decreasing the reliability of the portion of the codeword based, at least in part, on a determination that the first parity information and the second parity information disagree with hard bit information associated with the codeword.

Examples also describe a data storage device, comprising: a control means; and an error correction means associated with the control means and operable to: identify a plurality of codewords having a number of errors that exceed a correction capability of a first decoding scheme; determine that a number of the plurality of codewords exceeds a correction capability of a second decoding scheme; generate a list of potential codewords using at least one portion of a stripe codeword associated with a first codeword of the plurality of codewords using the second decoding scheme; determine a reliability of each potential codeword in the list of codewords; and provide at least one potential codeword in the list of codewords to the first decoding scheme. In an example, the first decoding scheme is a low-density parity check (LDPC) decoding scheme and the second decoding scheme is a redundant array of independent dies (RAID) decoding scheme. In an example, the list of potential codewords is ordered based, at least in part, on a determined probability that each potential codewords in the list of potential codewords contain errors. In an example, the potential codewords in the list of potential codewords are ordered based, at least in part, on an amount of errors. In an example, the error correction means is further operable to compare at least a portion of the at least one potential codeword to reliability information associated with the first codeword. In an example, the error correction means is further operable to determine a combined reliability of each of the potential codewords in the list of potential codewords.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

determining a codeword has failed a first decoding process using a first decoding scheme;

based, at least in part, on determining the codeword has failed the first decoding process using the first decoding scheme, identifying first parity information and second parity information associated with a portion of the codeword, the first parity information and the second parity information being associated with a second decoding scheme;

adjusting a reliability of the portion of the codeword when the first parity information agrees with the second parity information; and providing the reliability of the portion of the codeword to the first decoding scheme for a second decoding process.

2. The method of claim 1, wherein the first decoding scheme is a low-density parity check (LDPC) decoding scheme.

3. The method of claim 1, wherein the second decoding scheme is a redundant array of independent dies (RAID) decoding scheme.

4. The method of claim 1, wherein the first parity information is based, at least in part, on a XOR operation performed on different portions of a stripe codeword associated with the codeword.

5. The method of claim 1, wherein the second parity information is based, at least in part, on multiplying different portions of a stripe codeword associated with the codeword with a codebook associated with the second decoding scheme.

6. The method of claim 1, further comprising increasing the reliability of the portion of the codeword based, at least in part, on a determination that the first parity information and the second parity information agree with hard bit information associated with the codeword.

7. The method of claim 1, further comprising decreasing the reliability of the portion of the codeword based, at least in part, on a determination that the first parity information and the second parity information disagree with hard bit information associated with the codeword.

8. The method of claim 1, wherein the reliability comprises a log likelihood ratio (LLR) associated with the portion of the codeword.

9. A data storage device, comprising:
- a controller; and
- an error correction code (ECC) system associated with the controller and operable to:
  - identify a codeword having a number of errors that exceed a correction capability of a first decoding scheme;
  - identify first parity information and second parity information associated with the codeword, the first parity information and the second parity information being associated with a second decoding scheme;
  - calculate a reliability of a portion of the codeword when the first parity information agrees with the second parity information; and
- provide the reliability of the portion of the codeword to the first decoding scheme.

10. The data storage device of claim 9, wherein the first parity information is based, at least in part, on a XOR operation performed on different portions of a stripe codeword associated with the codeword.

11. The data storage device of claim 9, wherein the second parity information is based, at least in part, on multiplying different portions of a stripe codeword associated with the codeword with a codebook associated with the second decoding scheme.

12. The data storage device of claim 9, wherein the ECC system is further operable to increase the reliability of the portion of the codeword based, at least in part, on a determination that the first parity information and the second parity information agree with hard bit information associated with the codeword.

13. The data storage device of claim 9, wherein the ECC system is further operable to decrease the reliability of the portion of the codeword based, at least in part, on a determination that the first parity information and the second parity information disagree with hard bit information associated with the codeword.

14. The data storage device of claim 9, wherein the reliability comprises a log likelihood ratio (LLR) associated with the portion of the codeword.

15. A data storage device, comprising:
- a control means; and
- an error correction means associated with the control means and operable to:
  - identify a plurality of codewords having a number of errors that exceed a correction capability of a first decoding scheme;
  - determine that a number of the plurality of codewords exceeds a correction capability of a second decoding scheme;
  - generate a list of potential codewords using at least one portion of a stripe codeword associated with a first codeword of the plurality of codewords using the second decoding scheme;
  - determine a reliability of each potential codeword in the list of codewords; and
  - provide at least one potential codeword in the list of codewords to the first decoding scheme.

16. The data storage device of claim 15, wherein the first decoding scheme is a low-density parity check (LDPC) decoding scheme and the second decoding scheme is a redundant array of independent dies (RAID) decoding scheme.

17. The data storage device of claim 15, wherein the list of potential codewords is ordered based, at least in part, on a determined probability that each potential codeword in the list of potential codewords contains errors.

18. The data storage device of claim 15, wherein the potential codewords in the list of potential codewords are ordered based, at least in part, on an amount of errors.

19. The data storage device of claim 15, wherein the error correction means is further operable to compare at least a portion of the at least one potential codeword to reliability information associated with the first codeword.

20. The data storage device of claim 15, wherein the error correction means is further operable to determine a combined reliability of each of the potential codewords in the list of potential codewords.

* * * * *